United States Patent [19]

Seitelman et al.

[11] Patent Number: 4,548,531
[45] Date of Patent: Oct. 22, 1985

[54] METHOD FOR CHAMFERING THE EDGES OF GEAR TEETH

[75] Inventors: Leon H. Seitelman, Glastonbury; Edward J. Kaveckas, South Windsor, both of Conn.

[73] Assignee: United Technologies Corporation, Hartford, Conn.

[21] Appl. No.: 491,126

[22] Filed: May 3, 1983

[51] Int. Cl.[4] .............................................. B23F 17/00
[52] U.S. Cl. ........................................ 409/9; 76/101 A
[58] Field of Search ....................... 409/8, 9; 76/101 A

[56] References Cited

U.S. PATENT DOCUMENTS

| | | | |
|---|---|---|---|
| 1,680,083 | 8/1928 | Blades et al. | 409/8 |
| 2,135,819 | 11/1938 | Klix | 409/8 |
| 2,433,201 | 12/1947 | Cross | 409/9 |
| 2,976,772 | 3/1961 | Straw | 409/8 |
| 3,083,616 | 4/1963 | Male | 409/8 |
| 3,286,593 | 11/1966 | Bibbens | 409/8 |

Primary Examiner—Gil Weidenfeld
Assistant Examiner—Daniel W. Howell
Attorney, Agent, or Firm—C. G. Nessler

[57] ABSTRACT

The ends of gear teeth are chamfered using an arcuate motion cutter having a complex cross sectional shape. In an improvement of the prior trial and error techniques, the cutter shape is made correctly the first time using an algorithm which includes determining certain s-dimensions produced on a chamfer by a set of tool dimensions; comparing these to the desired maximum, minimum and nominal chamfer widths, and; then iteratively optimizing the set of tool dimensions to minimize the differences.

5 Claims, 10 Drawing Figures

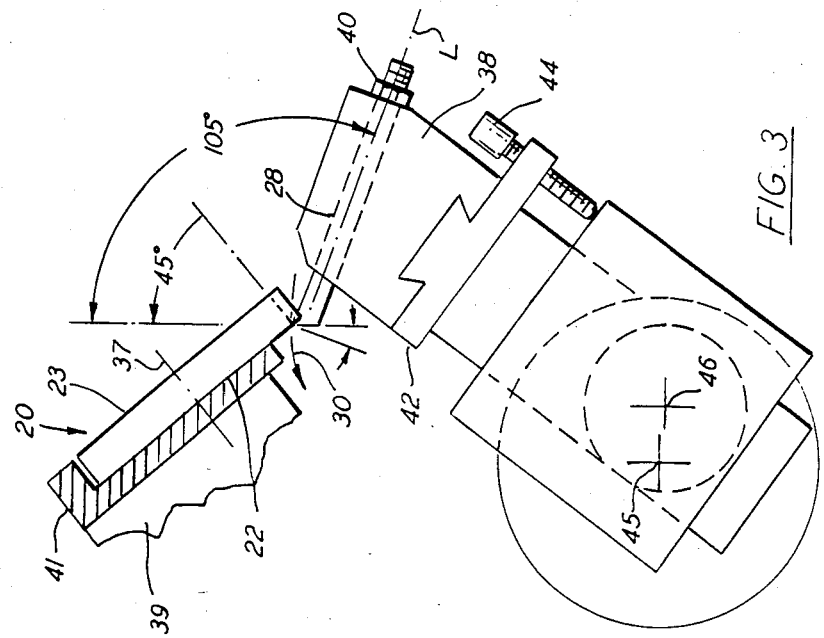
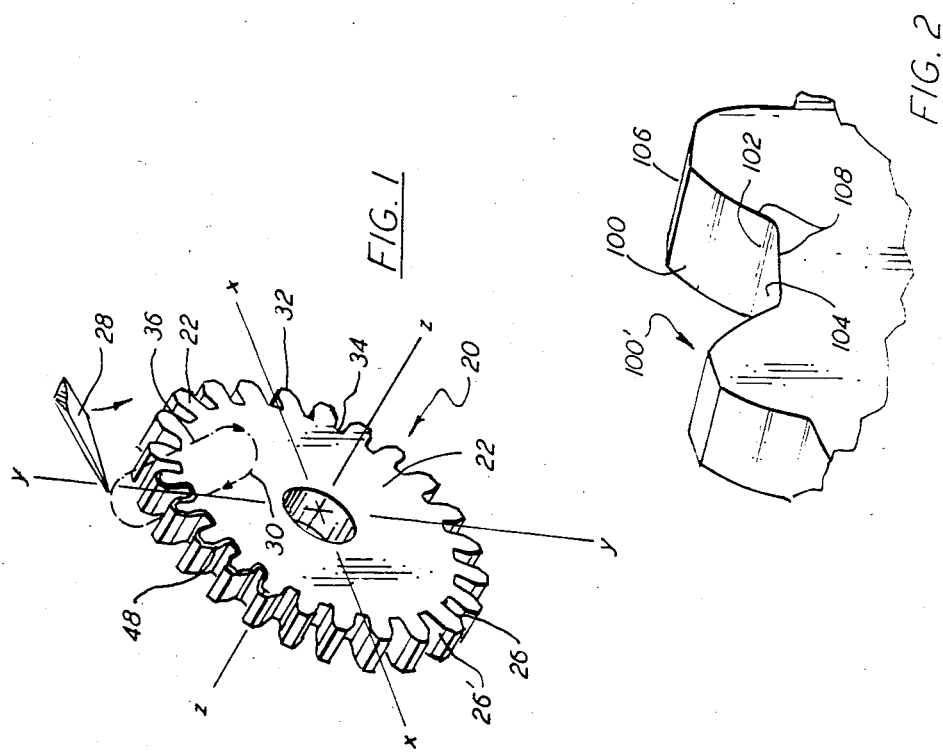

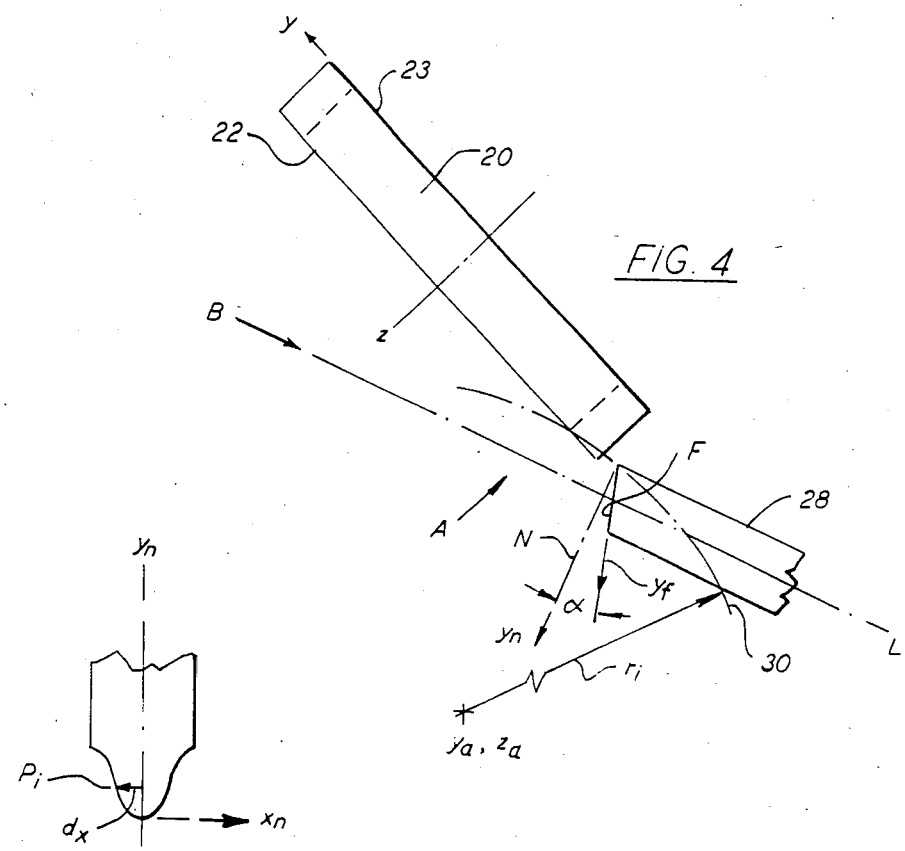
FIG. 4
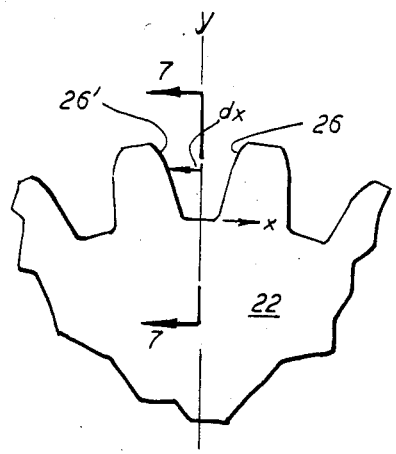
FIG. 6
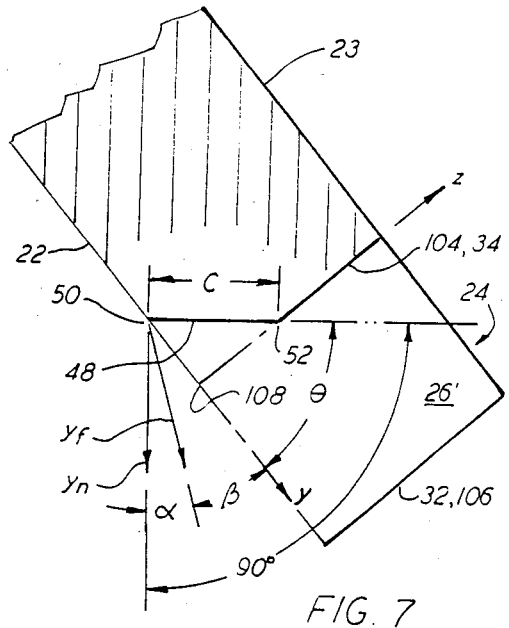
FIG. 5
FIG. 7

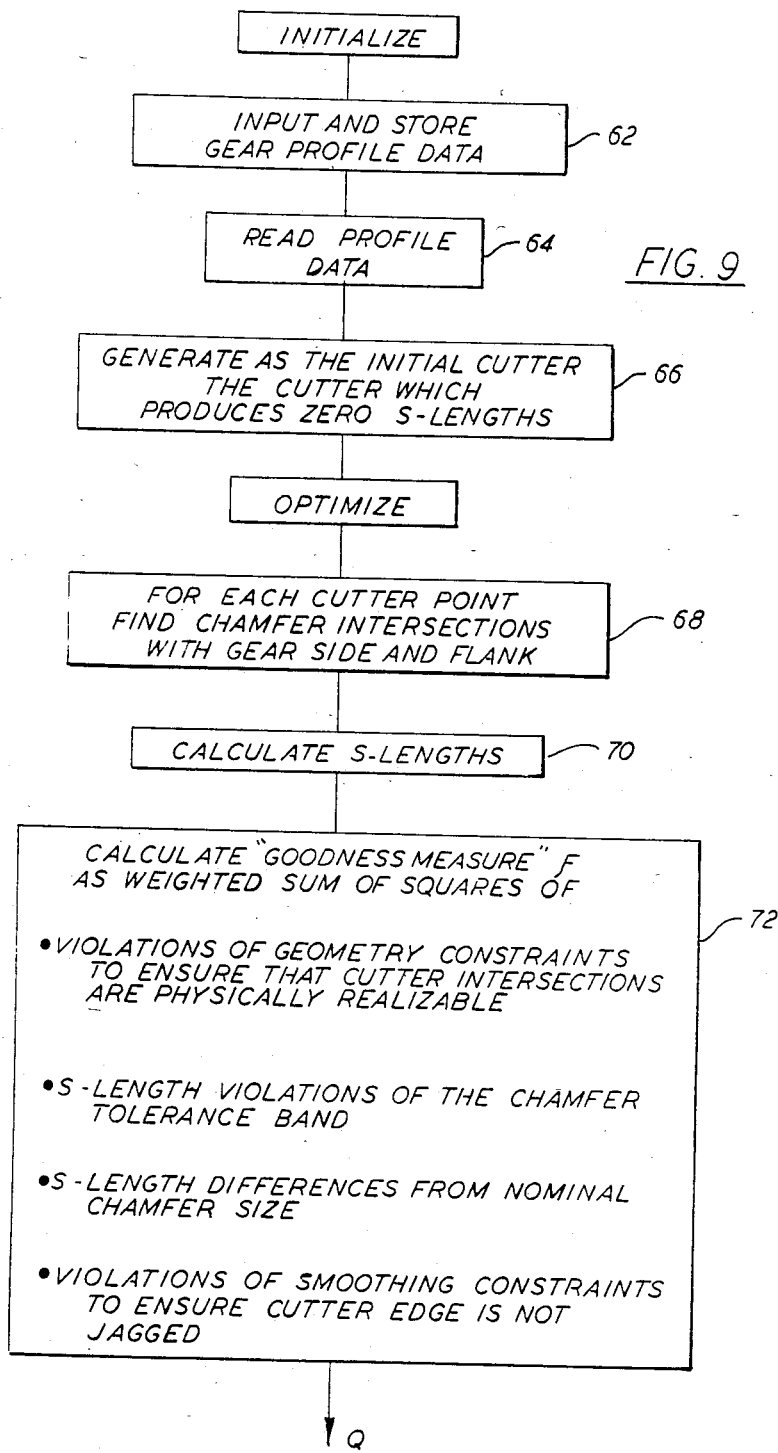

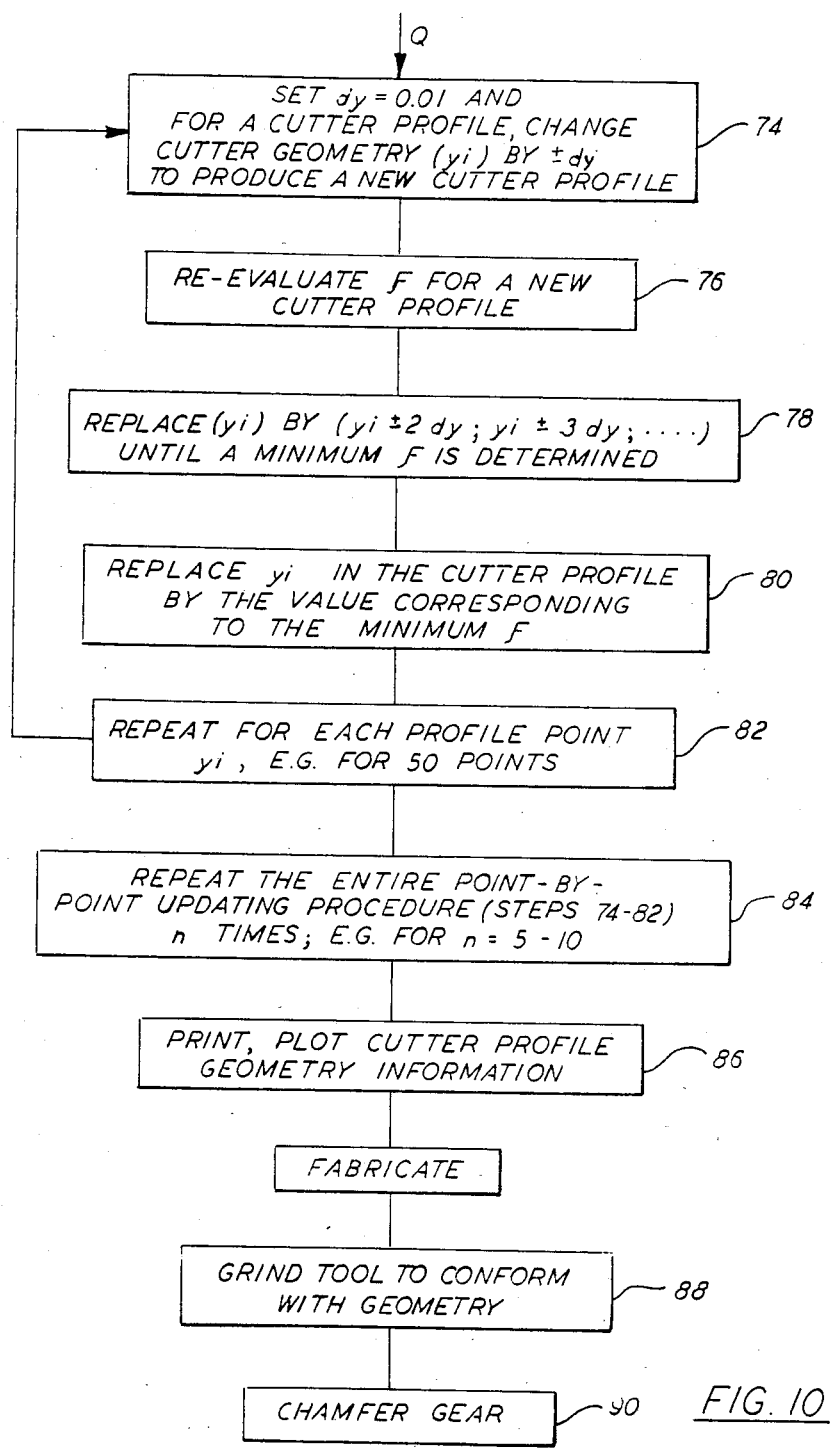

METHOD FOR CHAMFERING THE EDGES OF GEAR TEETH

TECHNICAL FIELD

The present invention relates to the chamfering of the ends (sides) of gear teeth, most particularly to the method of chamfering the sides of spur gears.

BACKGROUND

The advantages in durability and ease of engagement which result from chamfering the sharp edges of the teeth of gears, splines and the like have been well appreciated for a number of years. The early tedious methods of chamfering by hand, such as with a file, have been overcome with the introduction of specialized machines adapted for such purpose.

There are of course a number of conceivable machines which can be used to provide the uniform chamfer which is desired on the edges of gear teeth. In some instances the desired beveling has been achieved by cold working. More perferably, the chamfering is obtained by machining, such as those which utilize the circular motion of a planar faced cutting tool. One machine generally of the type to which the invention is pertinent is shown in U.S. Pat. No. 3,286,593 to Bibbens. Another machine, mentioned below, is called a Sheffield machine. Such machines are adapted to provide the cutting tool with reciprocating arcuate motion, whereby a chamfer is made on each forward stroke, and the gear is indexed during each return stroke to present a new tooth form to the cutter. The present invention is specifically adapted to such types of machines wherein the tool swings through an arc in a plane which is generally perpendicular to the plane of the sides of the teeth being chamfered. Since gear teeth have involute shapes of some complexity, and since the motion of the cutting tool has a transverse circular motion, the geometry of the tool is not at all evident. Accordingly, the making of cutting tools for chamfering machines has remained within the realm of a skilled tool and die maker. Such toolmaking skill is acquired by example from their predecessors and from their own experience and judgment. Essentially, a "cut and try" procedure is used. That is, the craftsman relies on his experience to make a first tool. For example, a 45 degree projection of the tooth form might be used, since the tangent to the arcuate motion of the cutting tool with respect to the plane of the teeth ends approximately lies on such an incline. The toolmaker then places the tool in an actual machine and tests its cutting action on an actual gear. After observing the results according to imperfections of the chamfer which is produced, he repetitively changes the contour of the tool until he arrives at a tool which hopefully produces the desired specification chamfer.

In precision and high performance machinery, the specification on chamfer width can be relatively tight. For example, a chamfer on a typical gear of about 11 inch diameter and having 69 teeth, might require the chamfer width of 0.040±0.010. Typically, the chamfer is placed on the gear prior to hardening. When the gear is subsequently finished by further material removal, a comparatively small chamfer remains. Thus the location of the chamfer must be accurately placed to achieve the desired purpose. Despite the ability of skilled mechanics, the making of a tool is a tedious and labor intensive process. Actual gears must be made before the tool shape can be ascertained, leading to production delays. Valuable gear parts can be consumed in the trial and error tool-making process. And perfection is seldom achieved; some inferiority in the quality of the chamfer must often be accepted in the interests of expediency and economy.

DISCLOSURE OF THE INVENTION

Among the objects of the invention are to provide more precise and uniform chamfers on gears, and to provide a means for determining the dimensions of a gear chamfering tool in a direct fashion, without the necessity of carrying out experiments with tools on actual gear parts.

According to the invention, the dimensions of a tool are determined and optimized through the use of a procedure which involves using s-dimensions. S-dimensions are functions measured from one or both opposing edges of the chamfer which is created by the tool as it moves along its curved cutting path. They are the equal to the radii of inscribed circles lying on the chamfer and thus are the minimum distances across the chamfer at the points of measurement. Preferably, s-dimensions are referenced to both the opposing edges of the chamfer; they are ascertained as pairs where the curved path of a tool cutting edge point intersects the chamfer edges. An iterative optimization process is used to conform the s-dimensions produced by different tool profile shapes to the chamfer width tolerances, and to the nominal or average chamfer width in the optimum embodiment of the invention. As a starting point we prefer to take the dimensions of a tool profile which produces zero chamfer and incrementally iterates thereafter.

In the practice of the invention, tools are now produced which very precisely make uniform chamfers without any need for trial and error testing and correction by a toolmaker. Not only are tolerances conformed with but the desired nominal dimensions are essentially achieved.

The foregoing and other objects, features and advantages of the present invention will become more apparent from the following description of preferred embodiments and accompanying drawings.

BRIEF DESCRIPTION OF THE DRAWINGS

FIG. 1 shows a gear in perspective, with the axes which define it in the description of the invention.

FIG. 2 is a more detailed view of a few of the teeth of the gear in FIG. 1.

FIG. 3 is a simplified view of parts of the gear chamfering machine and a gear, illustrating with FIG. 1 how the gear is chamfered by the reciprocating circular motion of the tool.

FIG. 4 is a more detailed view of the gear and cutter relationships shown in FIG. 3.

FIGS. 5 and 6 are related views of the side of the gear and the normal plane of the cutter, respectively, showing that the y axes lie in the same plane and that the x axis dimensions for both are identical.

FIG. 7 is a cross section through a gear along the y-z plane showing the chamfer produced by a cutter in the root land location.

FIGS. 9 and 10 comprise a flow chart showing the steps by which the inventive tool is made.

BEST MODE FOR CARRYING OUT THE INVENTION

Figure 8:
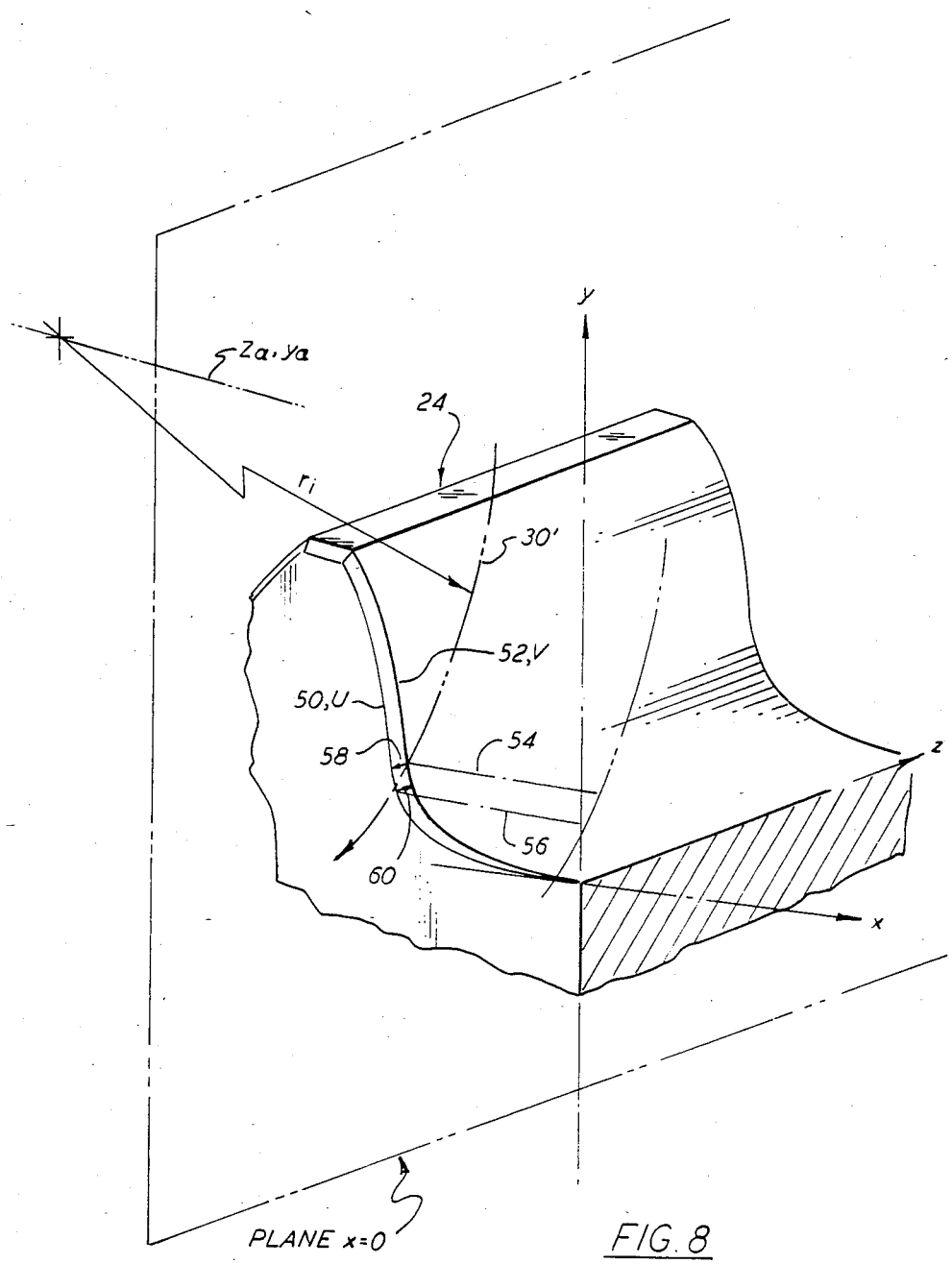
FIG. 8 is a perspective view of a gear tooth showing the chamfer and a physical manifestation of the opposing s-dimensions at a point.

The invention is described in terms of the cutting of a conventional spur gear on a Sheffield Model 380 deburring machine (Sheffield Co., formerly of Dayton, Ohio). Nonetheless, the invention will be appreciated as being applicable to the chamfering of other types of gears, splines and the like wherein the relationship between the tool, the tool motion, and the workpiece present similar problems to those described herein.

The description which follows is mathematical in nature and the method is most readily practiced using a digital computer. While the iterative optimization is only efficiently carried out by means of computer, the method of the invention will be appreciated as being susceptible to solution by manual means, i.e. physical making, measurement and calculation, but for the desire for efficiency and highest accuracy. When the mathematical description of the invention is understood, it will be appreciated that the method of the invention involves measurement and use of the parameters which heretofore have not been utilized in the older experimental or empirical procedures practiced by craftsman, to the extent that they are susceptible to deduction and articulation.

FIG. 1 shows a spur gear 20 having orthogonal x, y and z axes. The gear has sides (or ends, or faces) 22, 23 with which the several teeth 24 intersect. Referring to both FIG. 1 and FIG. 2, each tooth has the characteristic involute shape on its active profiles 100, 100'. Each profile of a tooth transitions to a fillet 102. The adjacent teeth are connected by a root land 104. At the tip 32 end of each tooth, there is a top land 106. The surfaces 100, 102, half of 104 (and sometimes including a portion of the land 106), are collectively called hereinafter the flank 26 of a tooth. The present invention is directed to making a chamfer 48 of the edge 108 formed by the intersection of the flank with the gear side. In the use of the Sheffield machine the edges formed at the opposing flanks 26, 26' of adjacent teeth are chamfered by motion of the tool 28, as shown in FIGS. 1 and 3.

Referring to FIG. 1, the tool has a cutting motion described by the circular path 30, wherein it removes material progressively from the tip 32, to the root 34 of the opposing flanks of adjacent teeth. When the cutting action is complete, the cutter returns on a slightly different path 36, owing to a change in the location of the center of rotation of the tool bit, as it is built into the machine tool.

Referring to FIG. 3, the gear 20 is shown mounted in a pocket-like fixture 41 attached to the machine base 39, so that is is able to rotate about its centerline 37. The gear rotates with a stepping motion in cooperation with the movement of the tool 28, so that all the gear teeth may be chamfered. As will be seen from FIG. 3, the motion of the cutting tool is such that it chamfers the underside 22 of the gear, as it is mounted on the machine. To chamfer the opposing side 23 the gear is removed and placed in the fixture so side 23 is nearest the base of the machine.

The tool 28 is held in a holder 38 so that it has a multiplicity of motions with respect to the gear. First, the tool 28 is adapted to move axially along its longitudinal axis L, by means of adjusting nut 40. Second, the tool holder 38 is adapted to move with respect to the slide 42 in a direction transverse to the plane of the Figure, so that the tool axis may be positioned along a diameter (y axis) of the gear 20. Third, the slide 42 moves in and out by means of screw 44 to move the arc path 30 further or closer to the gear. Fourth, the tool is adapted to move along a rotary path, in the plane of the Figure, due to rotation about the pivots 45, 46. Adjustment of the pivot points causes the tool to move along the eccentric path 30, 36 which was described previously. Such eccentric circular motion mechanisms are well known to those who are familiar with machine tools.

FIGS. 4–6 and 8 illustrate some of the terminology which is used in this description of the invention. FIG. 4 is another view of the relationship between the gear 20 and the cutter 28, as shown in FIG. 3. The tool 28 has a long axis L, and a front face F which is inclined at an angle $\alpha$ with respect to the normal plane N of the tool length. The dimensions of the normal plane N constitute the tool profile which is referred to herein. The path 30 of a point P(x,y,z) is described by the sweep of a radius $r_i$ about the pivot point $(x, y_a, z_a)$. The gear 20 has primary axes x, y and z (where x is in the direction perpendicular to the plane of FIG. 4). The tool bit also has x, y and z axes. By definition herein, the x axis of the tool bit is made parallel to the x axis of the gear. The y axes ($y_f$ and $y_n$) and z axis of the tool bit are inclined with respect to the primary y and z axes.

FIGS. 5 and 6 show views of the gear and tool bit in the directions A and B respectively, as indicated in FIG. 4. FIGS. 5 and 6 are purposely vertically aligned in the drawing to illustrate that the y axes lie in the same plane and that the x axes of each part are parallel. Thus, the point $P_i$ on the cutter face can only cut material from the gear which has the same coordinate, namely dx. With this convention, the position of point P can be defined, first when it reaches the flank 26' and then, when it pierces the gear side 22.

FIG. 7 shows a chamfer 48 having width c at the root 104, 34 of the gear as it will be cut by the cutter having a normal cross section which is defined by a set of points $P_i$ with coordinates $(\bar{x}_i, \bar{y}_i)$; $i = 1, 2, \ldots, n$ in the $x - y_n$ coordinate system. Since the cutter face F makes an angle $\alpha$ with the normal plane N, the cutter face points have coordinates $(\bar{x}_i, \bar{y}_i \sec \alpha)$ in the $x - y_f$ coordinate system of the plane F. The resulting chamfer 48 at the root land of the adjacent teeth 24 is desired to have a width c, as shown. Consequently, the coordinates $(x_i, y_i, z_i)$ of the points on the cutter face F in the x,y,z coordinate system satisfy the relations $$x_i = \bar{x}_i = \bar{x}_i$$

$$y_i + c \cos \theta = y_i \cos \beta = \bar{y}_i \sec \alpha \cos \beta$$

$$z_i = -y_i \sin \beta = -\bar{y}_i \sec \alpha \sin \beta$$

where $$\beta = \pi/2 - \alpha - \theta,$$

Thus, we have $$x_i = \bar{x}_i$$

$$y_i = \bar{y}_i \sec \alpha \sin (\alpha + \theta) - c \cos \theta$$

$$z_i = -\bar{y}_i \sec \alpha \cos (\alpha + \beta).$$

Consequently, these equations for the cutter face can be solved for their intersections with the gear side 22 (where z=0) and with the gear flank 26, 26'. Since the cutter moves by rotation about the axis $y=y_a$, $z=z_a$ and the distance $r_i$ to point $P_i$ is $$r_i = [(y_a - y_i)^2 + (z_a - z_i)^2]^{\frac{1}{2}}$$

Then we have, for the intersection of $P_i$ and the gear side 22

$$x_i = x_i$$

$$y_i = y_a \pm (r_i^2 - z_a^2)^{\frac{1}{2}}$$

$$z_i = 0$$

where the sign is chosen in $y_i$ so that $y_i$ is nearer to zero, to be consistent with the physical problem shown in the Figures and to avoid an irrelevant solution.

Similarly, to determine the intersection of the cutter face F with the gear flank 26, 26' we recognize that for $x = x_i$, if $(x_i, y_i, 0)$ is the coordinate of a point on the gear tooth (determined by piecewise linear interpolation between successive gear tooth data points), then the flank contains points of the form $(x_i, y_i, z)$ for $z > 0$. The cutter face point $P_i$ intersects the flank at $(x_i, y_i, z_i)$ where $$r_i = ((y_a - y_i)^2 + (z_a - z_i)^2)^{\frac{1}{2}}$$

Similarly to above, the smaller value of $z_i$ is chosen.

At this point, having defined the set of cutting tool intersections with the tooth side and flank, piecewise linear interpolation gives us two space curves which define the opposing edges 50, 52 of the chamfer, respectively at the side and flank. This permits evaluation of parameters indicative of the variation in chamfer width c. For simplicity, the typical side intersection 50 is denoted by $U_i = (x_i, y_i, 0)$ and the typical flank intersection 52 by $V_j = (x_j, y_j, z_j)$. Thus, the distance $d_{ij}$ between $U_i$ and $V_j$ is $$d_{ij} = [(x_i - x_j)^2 + (y_i - y_j)^2 + z_j^2]^{\frac{1}{2}}.$$

And the minimum of the $d_{ij}$'s can be found for all j, namely $$u_i = \min_j (d_{ij})$$

Thus, it will be appreciated that $u_i$ is the shortest distance across the chamfer surface, as measured from the gear side at $(x_i, y_i, 0)$.

Similarly, the width $v_i$ of the chamfer as measured from a point $(x_i, y_i, z_i)$ along the flank intersection $V_i$ is $$v_i = \min_j [(x_j - x_i)^2 + (y_j - y_i)^2 + z^2]^{\frac{1}{2}}$$

It will be appreciated upon reflection that the foregoing chamfer width functions (hereinafter called s-lengths) $u(x)$ and $v(x)$ are not necessarily identical, nor dimensions which lie normal to the mean width line running along the chamfer length. This is made graphically evident in the example of FIG. 8. A point P on the cutter traveling on cutter path 30' first contacts the tooth along chamfer flank edge 52, V and last contacts the tooth at side edge 50, U. Both points lie at the same x-distance 54, 56 from the y axis. The s-dimensions 58, 60 from the opposing edges are seen to be offset. It will also be appreciated that since they are inscribed circle radii, for a chamfer more irregular than that shown, the s-dimensions will be non-parallel. They are physically measurable on a given chamfer, of course, as they are referenced from the respective opposing chamfer edges. Their use is prudent in achieving the object of the invention insofar as chamfer width, especially near the tip 32 and root 34 of the gear teeth. If the s-lengths lie within the desired chamfer tolerance band, then the tool may be satisfactory for the gear. If they do not, then the cutter is changed until they do. That is, if at least one of $$c_{min} \leq u(x) \leq c_{max}$$

and $$c_{min} \leq v(x) \leq c_{max}$$

does not hold, where $c_{min}$ and $c_{max}$ are, respectively, the minimum and maximum specified chamfer widths, then the cutter geometry must be modified.

Several methods to improve the cutter shape are possible for certain situations. For example, if both $u(x)$ and $v(x)$ are larger than $c_{max}$ for $x = x_i$, for some i, then the chamfer is obviously too wide at $x_i$ and the cutter geometry must be altered to cut less material. That is, the corresponding $y_i$ is decreased.

A better solution is to treat all the $y_i$ as variables and to treat the problem as one of optimization. Thus $y_i$ is chosen so that a minimum value is provided to the function $$f = \sum_{i=1}^{n} \{[u(x_i) - c_{max}]_+ + [c_{min} - u(x_i)]_+ +$$

$$[v(x_i) - c_{max}]_+ + [c_{min} - v(x_i)]_+\}^2$$

where $$\zeta_+ = \begin{cases} \zeta & \text{if } \zeta \geq 0 \\ 0 & \text{if } \zeta < 0 \end{cases}$$

Since f is a sum of squares, $f \leq 0$. When both $u(x)$ and $v(x)$ lie within the specified or desired chamfer width tolerance band, then none of the terms in the square brackets is positive; therefore f is zero. Hence f is minimized when the cutter is acceptable.

The most refined procedure is to determine the minimum f by considering all $y_i$ as variables and solving the unconstrained minimization problem. But it is considerably more efficient computationally to use a smaller set of data points (e.g. 50) and to fit this reduced set of points parametrically to produce spline fits to describe the cutter surface F, to determine the function f corresponding to the set of data points $(x_i, y_i)$ interpolated to this spline fit, and to modify the reduced set of variables so as to minimize f.

The implementation of the fit which we have thus far employed to advantage is shown in its essentials in FIGS. 9 and 10 as a flow chart suitable for programming a digital computer. Referring to the chart, the initialization steps 62–66 include the generation of an initial cutter which produces zero s-lengths (and zero chamfer width). Although other starting points based on tool designer experience or other calculations may be used, the zero s-length profile is an especially convenient starting point. The procedure described herein allows its easy determination and the approach does not require a toolmaker's judgment. In the optimization steps 68–86, the sub-steps of the "goodness measure, f" determination at step 72 enable not only a chamfer which has widths within tolerance, but which also is smooth along the edges and surface and which approximates the nominal (i.e. average of the maximum and minimum) width. Thus, a tool is made which is substantially better than trial and error has been able to produce. The incremental iteration steps 74–82 are repeated for a desired number of points along the cutter normal profile. We have used 50 and found the results to be satisfactory, as have we found 5–10 updatings in step 84. However, in both instances departures from these values may be usable, according to the computational time available and the quality of the output results. At step 86 the results are output to enable fabrication of the tool and chamfering of the gear. Of course additional outputs and visual displays beyond those indicated may be utilized at various steps in the foregoing procedure, and if desired, provisions may be made for interaction between a tool designer and the operative steps, such as to enable sub-problem optimization of a particular region of the tool profile, prior to the complete solution.

Although this invention has been shown and described with respect to a preferred embodiment, it will be understood by those skilled in the art that various changes in form and detail thereof may be made without departing from the spirit and scope of the claimed invention.

We claim:

1. The method of producing on the edges of the teeth of a gear a chamfer having desired maximum and minimum edge-to-edge width dimensions along its length, where the edge of each gear tooth is formed by the intersection of a tooth side generally lying in an x-y plane and a tooth flank generally running perpendicular thereto in a z axis direction, while using a cutting tool which has circular motion about an axis perpendicular to the y-z plane, which comprises selecting a first tool profile and determining s-dimensions at a multiplicity of points along the length of the chamfer which would be produced by the first tool profile, where the s-dimensions are the distances across the chamfer from an edge thereof to the nearest point on the opposing edge thereof; comparing the s-dimensions to the chamfer width desired at each of the said multiplicity of points; iteratively selecting further tool profiles each of which is different from the prior tool profile, and determining for each the s-dimensions at a multiplicity of points along the length of the chamfer which would be produced and comparing them to the chamfer widths desired, until a final tool profile is determined, which profile provides s-dimensions falling within the range of the desired minimum and maximum chamfer widths; making a tool having substantially said final profile, and; chamfering the teeth with the tool so made.

2. The method of claim 1 which further comprises determining a pair of s-dimensions at each of the multiplicity of points, which pair comprises a first s-dimension referenced from a point on the tooth flank edge of the chamfer and a second s-dimension referenced from a point on the tooth side edge of the chamfer, the pair of chamfer edge reference points lying along the circular cutting path of a point on the tool profile.

3. The method of claim 1 which further comprises selecting as the first tool profile that profile which characterizes a tool shaped to contact the edges of the teeth while producing a chamfer of essentially zero width.

4. The method of claim 1 which further comprises minimizing the differences between the s-dimensions and the average chamfer width at the points where the s-dimensions are determined.

5. A tool having a profile made according to the method of claims 1, 2, 3 or 4.

* * * * *